US011155010B2

(12) United States Patent
Recher et al.

(10) Patent No.: US 11,155,010 B2
(45) Date of Patent: Oct. 26, 2021

(54) METHOD FOR PREPARING A TWO-COMPONENT ARTICLE AND ARTICLE OBTAINABLE BY THE METHOD

(71) Applicant: TELENE SAS, Bondues (FR)

(72) Inventors: Gilles Recher, Marcq-en-Baroeul (FR); Reynald Marquette, Lens (FR)

(73) Assignee: TELENE SAS, Bondues (FR)

( * ) Notice: Subject to any disclaimer, the term of this patent is extended or adjusted under 35 U.S.C. 154(b) by 354 days.

(21) Appl. No.: 16/073,877

(22) PCT Filed: Feb. 1, 2017

(86) PCT No.: PCT/EP2017/052097
§ 371 (c)(1),
(2) Date: Jul. 30, 2018

(87) PCT Pub. No.: WO2017/134073
PCT Pub. Date: Aug. 10, 2017

(65) Prior Publication Data
US 2019/0039271 A1 Feb. 7, 2019

(30) Foreign Application Priority Data

Feb. 1, 2016 (EP) .................................... 16305100

(51) Int. Cl.
B29C 45/00 (2006.01)
C08G 61/08 (2006.01)
B32B 27/08 (2006.01)
B29D 1/00 (2006.01)
B32B 27/24 (2006.01)
B32B 1/08 (2006.01)
B32B 7/04 (2019.01)
B32B 27/32 (2006.01)
B29C 45/14 (2006.01)
E21D 11/04 (2006.01)
F16L 58/18 (2006.01)
E21D 11/38 (2006.01)
B29K 623/00 (2006.01)
B29L 23/00 (2006.01)
B29L 31/24 (2006.01)
F16L 58/10 (2006.01)

(52) U.S. Cl.
CPC .... B29C 45/0001 (2013.01); B29C 45/14598 (2013.01); B29D 1/00 (2013.01); B32B 1/08 (2013.01); B32B 7/04 (2013.01); B32B 27/08 (2013.01); B32B 27/24 (2013.01); B32B 27/32 (2013.01); B32B 27/325 (2013.01); C08G 61/08 (2013.01); E21D 11/04 (2013.01); F16L 58/181 (2013.01); B29C 2045/14868 (2013.01); B29K 2623/06 (2013.01); B29K 2623/12 (2013.01); B29L 2023/00 (2013.01); B29L 2031/24 (2013.01); B32B 2250/02 (2013.01); B32B 2250/242 (2013.01); B32B 2307/54 (2013.01); B32B 2307/7242 (2013.01); B32B 2307/7265 (2013.01); B32B 2571/00 (2013.01); B32B 2571/02 (2013.01); B32B 2605/00 (2013.01); C08G 2261/135 (2013.01); C08G 2261/3325 (2013.01); C08G 2261/418 (2013.01); C08G 2261/76 (2013.01); E21D 11/385 (2013.01); F16L 58/1009 (2013.01); F16L 58/1054 (2013.01)

(58) Field of Classification Search
CPC ..................... B29C 45/0001; B29C 45/14598
See application file for complete search history.

(56) References Cited

U.S. PATENT DOCUMENTS

2012/0270040 A1* 10/2012 Rule ..................... C09J 165/00
428/339

FOREIGN PATENT DOCUMENTS

| CA | 2028884 A1 * | 5/1991 | ............... C08J 5/00 |
| CN | 1578726 A | 2/2005 | |
| EP | 0412525 A2 | 2/1991 | |
| EP | 0577125 A1 | 1/1994 | |
| EP | 2460587 A1 | 6/2012 | |
| EP | 2960267 A1 | 12/2015 | |
| JP | H0914574 A | 1/1997 | |
| JP | 2001056090 A | 2/2001 | |
| JP | 3614933 B2 | 1/2005 | |
| JP | 2014221876 A | 11/2014 | |

(Continued)

OTHER PUBLICATIONS

PCT International Search Report and Written Opinion from PCT/EP2017/052097 dated Apr. 7, 2017, 16 pages.
PCT International Preliminary Report on Patentability from PCT/EP2017/052097 dated Apr. 26, 2018, 9 pages.
A) Database Caplus, [Online] Dec. 17, 1996, (Dec. 17, 1996), Morita Tooru et al: "Method for prevention of corrasion of joints of metal pipes", XP002684851, retrieved from Caplus; STN, Database accession No. 1997-134653;—& b) JP 3 614933 B2 (Furukawa Electric Co Ltd; Nippon Zeon Co) Jan. 26, 2005 (Jan. 26, 2005)—& c) © TXPJPEB machine translation of JP3614933B2 into English.

(Continued)

Primary Examiner — Leith S Shafi
Assistant Examiner — Nicholas R Krasnow
(74) Attorney, Agent, or Firm — Kacvinsky Daisak Bluni PLLC

(57) ABSTRACT

A method for preparing an article includes at least a first component of a polyolefin in conjunction with a second component of a polymer made by ring-opening metathesis polymerisation of norbornene type monomers. The method includes pre-treating a surface of the first component, applying a ring-opening metathesis polymerisable mixture of norbornene type monomers and a catalyst to the surface, and curing the ring-opening metathesis polymerisable mixture in contact with the surface, wherein the ring-opening metathesis polymerisable mixture has a $\eta_{1000}$ at 30° C. of more than 9 sec. Articles such as a pipe line field joint or a protective element for a concrete tunnel lining element can be made using the method.

15 Claims, No Drawings

(56) References Cited

FOREIGN PATENT DOCUMENTS

| WO | WO-9816721 A1 | * | 4/1998 | ............. E21D 11/08 |
|---|---|---|---|---|
| WO | 2011084418 A1 | | 7/2011 | |
| WO | 2015134095 A1 | | 9/2015 | |

OTHER PUBLICATIONS

A) Database Caplus, [Online] Jan. 17, 1997 (Jan. 17, 1997), Ikeda Shintaro et al: "Corrosion prevention for underground pipes", XP002684850, retrieved from Caplus; STN Database accession No. 1997-203766—& b) JP H09 14574 A (Furukawa Electric Col TD; Japan Steel & Tube Constr; Nippon Zeon Co) Jan. 17, 1997 (Jan. 17, 1997)—& c) machine translation of JP H09 14574 A into English provided by the JPO.

A) Database CA [Online] Chemical Abstracts Service, Columbus, Ohio, US; Nov. 27, 2014 (Nov. 27, 2014), Iwabuchi, Satoshi: "Manufacture of crosslinking cycloolefin polymer compositions containing liquid rubbers and metathesis catalysts, and manufacture of crosslinked cycloolefin polymer films", XP002757005, retrieved from STN, Database accession No. 2014:1979835—& b) JP 2014 221876 A (Nippon Zeon Co) Nov. 27, 2014 (Nov. 27, 2014)—& c) © TXPJPOEA machine translation of D8b into English.

A) Database CA [Online] Chemical Abstracts Service, Columbus, Ohio, US; Feb. 28, 2001 (Feb. 28, 2001), Tanimoto, Hirotoshi et al: "Protection method for joints of propulsion pipes for underground pipeline construction", D9 XP002757006, retrieved from STN, Database accession No. 2001 :143777—& b) JP 2001 056090 A (Nippon Zeon Co; Japan Steel & Tube Constr; Nippon Kokan KK) Feb. 27, 2001 (Feb. 27, 2001)—& c) ©—TXPJPOEA machine translation of D9b into English.

PCT Second Written Opinion from PCT/EP2017/052097 dated Jan. 15, 2018, 7 pages.

* cited by examiner

METHOD FOR PREPARING A TWO-COMPONENT ARTICLE AND ARTICLE OBTAINABLE BY THE METHOD

This is a national stage application filed under 35 U.S.C. 371 of pending international application PCT/EP2017/052097, filed Feb. 1, 2017, which claims priority to European Patent application EP16305100.6, filed Feb. 1, 2016, the entirety of which applications are incorporated by reference herein.

FIELD OF THE DISCLOSURE

The present invention relates to a method for preparing an article comprising at least a first component of a polyolefin in conjunction with a second component of a polymer made by ring-opening metathesis polymerisation of cyclic olefin monomers. The invention further relates to an article, obtainable by the method.

BACKGROUND OF THE INVENTION

Articles of a polyolefin component in conjunction with a component of a polymer made by ring-opening metathesis polymerisation of cyclic olefin monomers are for instance known from WO2012168149. This document discloses a field joint coating material based on a fast curable cyclic olefin composition comprising norbornene-type monomers, preferably dicyclopentadiene monomers. The cyclic olefin composition provides a good adhesion to the outside protective coating, which may be a polyolefin coating for instance.

Although the field joint coating of WO2012168149 performs well, there is room for improvement. It would in particular be desirable if a more reliable adhesion of a polymer made by ring-opening metathesis polymerisation of cyclic olefin monomers on a polyolefin could be obtained for use in industrial applications. Indeed, no industrial application of a multi-component article as described above is known wherein the adhesion on the polyolefin shows a sufficient reliability.

It is an aim of the present invention therefore to provide a method for preparing an article comprising at least a first component of a polyolefin in conjunction with a second component of a polymer made by ring-opening metathesis polymerisation of cyclic olefin monomers, which method allows obtaining a reliable, consistent and long term stable adhesion of the two components.

SUMMARY OF THE INVENTION

The invention thereto provides a method for preparing an article comprising at least a first component of a polyolefin in conjunction with a second component of a polymer made by ring-opening metathesis polymerisation of cyclic olefin monomers in accordance with claim 1. The method in particular comprises pre-treating a surface of the first component, applying a ring-opening metathesis polymerisable mixture of cyclic olefin monomers and a catalyst to the surface, and curing the ring-opening metathesis polymerisable mixture in contact with the surface, wherein the ring-opening metathesis polymerisable mixture has a $\eta_{1000}$ at 30° C. of more than 9 sec.

It has been established that the level of adhesion of the first component to the second component is not only higher than known in the prior art but is much more consistent. Indeed, the level of adhesion is in substantially all cases such that a cohesive failure of the first component occurs when loaded. The adhesion between the two components is therefore consistently stronger than the strength of the first component. The $\eta_{1000}$ at 30° C. represents the time needed to reach a viscosity of 1000 mPa·s when the polymerisable mixture of cyclic olefin monomers and the catalyst is held at a temperature of 30° C.

An embodiment of the invention provides a method wherein the ring-opening metathesis polymerisable mixture has a $\eta_{1000}$ at 30° C. of more than 10 sec, more preferably of more than 12 sec, even more preferably of more than 14 sec, even more preferably of more than 16 sec, and most preferably of more than 20 sec.

The ring-opening metathesis polymerisable mixture may be applied to the polyolefin surface in any conceivable way, for instance by brushing or spraying. In a preferred method however, applying the ring-opening metathesis polymerisable mixture to the surface comprises injecting the mixture against the surface. Injection molding of the ring-opening metathesis polymerisable mixture allows producing the second component with a consistently high quality, and therefore, in respect of the completed article, the adhesion of the second component to the first component is particularly high and of a consistently high quality, irrespective of the method used for producing the first component. By injection molding the ring-opening metathesis polymerisable mixture, said mixture wets the polyolefin surface of the first component substantially completely which further improves the adhesion.

Another advantage of the method of the invention is that an article is provided that is capable of withstanding relatively high water pressures, due to the high and consistent level of adhesion reached.

According to the invention, some pre-treatment of the surface of the first component to be bonded must be performed. Preferred pre-treatments comprise cleaning, abrading, sanding or machining the surface, or combinations of these pre-treatments. A particularly preferred pre-treatment comprises sanding the surface, in particular sand blasting.

An embodiment of the invention provides a method wherein the ring-opening metathesis polymerisable mixture comprises a chain transfer agent.

Another embodiment of the method according to the invention is characterized in that the ring-opening metathesis polymerisable mixture comprises from 0.01-10 phr of the chain transfer agent, more preferably from 0.05-5 phr, and most preferably from 0.1-2 phr.

Yet another embodiment provides a method wherein the ring-opening metathesis polymerisable mixture comprises an inhibitor. The inhibitor decreases the rate of the ring-opening polymerisation reaction, in contrast to a catalyst that may increase the rate of the reaction. It is also possible that the inhibitor reduces the effectiveness of a catalyst when used in the ring-opening metathesis polymerisable mixture.

Although the relative amount of the inhibitor may be chosen within a broad range, a preferred embodiment of the method according to the invention comprises a ring-opening metathesis polymerisable mixture comprising from 0.01-2 phr of the inhibitor, more preferably from 0.05-1 phr of the inhibitor, and most preferably from 0.1-0.5 phr of the inhibitor.

Another embodiment of the invention provides a method wherein the ring-opening metathesis polymerisable mixture comprises a chain transfer agent and an inhibitor, wherein the ratio of inhibitor to chain transfer agent is from 0.001 to 200, more preferably from 0.01-50, and most preferably from 0.05-5.

The polyolefin of the first component may be any polyolefin known to one skilled in the art. A method according to a preferred embodiment of the invention is characterized in that the polyolefin comprises a polyethylene.

The method may be used to manufacture a variety of multi-component articles. According to one preferred embodiment of the method, the article comprises a pipe line field joint.

According to another preferred embodiment of the method, the article comprises a protective element for a concrete tunnel lining element.

DETAILED DESCRIPTION OF THE INVENTION

The cyclic olefin used in the present invention comprises cyclic olefin monomer units that may be arranged to form a cyclic olefin polymer, obtained by polymerizing cyclic olefin monomer units. Any polymer of cyclic olefin monomer units known in the art may in principle be used in the invention. The cyclic olefin polymer comprises cyclic monomer units of a saturated cyclic hydrocarbon (cycloalkane) structure, and/or of an unsaturated cyclic hydrocarbon (cycloalkene) structure. The number of carbon atoms forming the cyclic structure in a monomer unit also is not particularly limited, but in preferred embodiments ranges from 4 to 30, more preferably from 5 to 20, and most preferably from 5 to 15.

The amount of cyclic olefin monomer units in the cyclic olefin polymer may be selected within a broad range, but is preferably 50 wt. % or more, more preferably 70 wt. % or more, and most preferably 90 wt. % or more, exclusive of any filler in the composition. A combination of different cyclic monomers may also be used. The cyclic olefin polymer of the second component may comprise an addition polymer of cyclic olefin monomer units, optionally copolymerized with another olefin monomer, and/or may comprise a ring-opening polymer of cyclic olefin monomer units, the latter being preferred.

A cyclic olefin monomer unit forms a cyclic structure of carbon atoms and carbon-carbon double bonds, examples whereof include but are not limited to norbornene based monomer units and monocyclic monomer units, a norbornene based monomer unit being preferred. The norbornene based monomer unit has a norbornene ring, and may for instance include 2-norbornene, norbornadiene and other bicyclic compounds; dicyclopentadiene (DCPD), dihydrodicyclopentadiene and other tricyclic compounds; tetracyclododecene, ethylidenetetracyclododecene, phenyltetracyclododecene and other tetracyclic compounds; tricyclopentadiene and other pentacyclic compounds; tetracyclopentadiene (TCPD) and other heptacyclic compounds; alkyl substituted compounds, such as methyl, ethyl, propyl and butyl substituted compounds, alkylidene substituted compounds, such as ethylidene substituted compounds, and aryl substituted compounds, such as phenyl and tolyl substituted compounds; and derivatives thereof having for instance an epoxy group, a methacryl group, a hydroxyl group, an amino group, a carboxyl group, a cyano group, a halogen atom, and others.

Monocyclic cyclic olefin monomer units may also be employed, suitable examples thereof comprising cyclobutene, cyclopentene, cyclooctene, cyclododecene, 1,5-cyclooctadiene and other monocyclic cyclic olefins, and substitution compounds and derivatives having polar groups like those mentioned as examples for the norbornene based monomer units. Such cyclic olefin monomers may be used alone or in combination with another or more types. Suitable linear olefin monomer units that may be addition-copolymerized with the above cyclic olefin monomer units include but are not limited to ethylene, propylene, 1-butene, 1-pentene, 1-hexene, 1-octene, 1-butene, 2-pentene, and 1,4-hexadiene for instance. The amount of the linear olefin monomer units used is preferably lower than 50 wt %, more preferably lower than 20 wt %, and more preferably lower than 10 wt % of the total amount of the cyclic olefin and linear olefin monomer units. The linear monomers act as chain transfer agent.

Apart from the cyclic olefin monomer units, the curable mixture further comprises a cyclic olefin metathesis polymerization catalyst in an amount of 30-1000 ppm relative to the total weight of the mixture. The metathesis polymerization catalyst of the invention comprises a catalyst capable of metathesis ring-opening polymerization (ROMP) of cyclic olefin monomer units. Such a catalyst may comprise a complex having a transition metal atom as center atom and a plurality of ions, atoms, and/or compounds bonded thereto. Transition metal atoms may be used to advantage, of which tantalum, molybdenum, tungsten, ruthenium and osmium may be mentioned in particular. Particularly useful catalytic systems comprise mono and bis-Schiff base ruthenium catalysts, and Mo—W catalysts.

The olefin metathesis polymerization catalyst may be used in any suitable form, including a form in which it is dissolved or suspended in a solvent. Suitable solvents include linear aliphatic hydrocarbons such as n-pentane, n-hexane, n-heptane, or liquid paraffin, as well as alicyclic hydrocarbons such as cyclopentane, cyclohexane, alkyl substituted cyclohexane, di- and tricycloheptane, and cyclooctane to name a few, aromatic hydrocarbons such as benzene, toluene, xylene and others; nitrogen-containing solvents such as nitromethane, nitrobenzene, and acetonitrile, halogen-containing solvents such as dichloromethane, dichloroethane, chlorobenzene and oxygen-containing solvents such as diethyl ether and tetrahydrofuran.

The curable mixture in a preferred embodiment also contains an inhibitor capable of extending working life time before curing starts to a $\eta_{1000}$ at 30° C. of more than 9 sec. Suitable polymerization reaction inhibitors include but are not limited to aromatic and aliphatic phosphines such as triphenylphosphine, tricyclohexylphosphine, tricyclopentylphosphine, aliphatic and aromatic phosphites such as trisopropylphosphite, trimethylphosphite, triphenylphosphite disclosed in EP2460587, N-donor ligands such as 1-methylimidazole, 4-methylaminopyridine, phenantroline, isochinoline, pyrazine and pyridine. The above inhibitors are preferably used in conjunction with Ruthenium-based catalysts. Other suitable inhibitors comprise alcohols, phenols, thiols, and linear alkynes, preferably used in conjunction with molybdenum-based catalysts. Of these, ethers, phenols and thiols are preferably used with tungsten-based catalysts.

The polymerisable mixture in another preferred embodiment also comprises a chain transfer agent, for instance a linear olefin having substituted groups. Suitable chain transfer agents include but are not limited to α-olefins such as 1-butene, 1-pentene, 1-hexene and 1-octene, aromatic vinyl compounds such as styrene, vinyltoluene, vinyl compounds such as vinylnorbornene, oxygen-containing vinyl compounds such as ethyl vinyl ether, isobutyl vinyl ether, allyl glycidyl ether, allyl acetate, allyl alcohol, glycidyl methacrylate, halogen-containing vinyl compounds such as allyl chloride, nitrogen-containing vinlyl compounds such as acrylamide, non-conjugated dienes such as 1,4 pentadiene, 1,4 hexadiene, 1,5 hexadiene, 1.6 heptadiene, 2-methyl-1.4- pentadiene and 2.5-dimethyl-1.5-hexadiene, conjugated dienes such as 1.3-butadiene, 1.3-pentadiene and 1.3-hexadiene.

Such chain transfer agents may be used alone or in combination with other chain transfer agents and/or inhibitors, and are generally added in an amount ranging from 0.01 to 10 pbw, and preferably 0.1 to 5 pbw with respect to 100 parts by weight of the cyclic olefin monomer units.

The ring-opening metathesis polymerisable mixture in accordance with the invention may be used in a variety of multi-component articles.

A preferred use comprises a field joint coating material. Oil or gas pipelines are typically formed in-situ from steel pipe sections that are provided with an outside protective coating, denoted as a 'parent coating'. Pipe section ends are left uncoated for welding with another pipe section. The welded pipe section ends, known as field joints, must be coated in-situ to provide protection to the ends.

Such a field joint coating can be made by a method comprising the steps of (i) pre-treating a bare metal surface of a steel pipe in a field joint area; (ii) applying an epoxy or epoxy phenol primer or an olefin type adhesive layer on the bare metal surface; (iii) applying an olefin type adhesive layer on the primed metal surface; (iv) pre-treating a surface of the parent coating; (v) putting in place a mould around the pipe in the field joint area to define a cavity between the internal surface of the mould and an outer surface of the pipe in the field joint area; and (vi) injecting the ring-opening metathesis polymerisable mixture having a $\eta_{1000}$ at 30° C. of more than 9 sec in the cavity; and (v) curing the ring-opening metathesis polymerisable mixture in contact with the outer surface.

The olefin type adhesive layer may comprise any olefin but is preferably a grafted linear low-density polyethylene (LLDPE) resin or a modified polypropylene resin having a maleic anhydride graft content of preferably above 4%, more preferably above 6%, and most preferably above 8%.

The mould may be purged with nitrogen prior to the injection of the ring-opening polymerisable mixture and the outer surface of the pipe and/or parts of the parent coating may be heated prior to the injection.

Due to the liquid and non polar olefin nature of the ring-opening polymerisable mixture, a good wetting of the outer surface is achieved. By adopting a mixture satisfying a $\eta_{1000}$ at 30° C. of more than 9 sec, an excellent adhesion is achieved after curing between the first component (the pre-treated pipe section including the polyolefin layers of the parent coating) and a second component being the ring-opening cured ("polymerized") polymerisable mixture, thus preventing water ingress and hydrolysis leading to in service field joint deterioration.

It is understood that a wide variety of fast ring-opening curable mixtures can be used, as long as they have a $\eta_{1000}$ at 30° C. of more than 9 sec. Such a curable olefin based mixture is typically a 2 or 3 component system but single component systems can also be used.

The surface of the first component may be at room temperature but may also be preheated to a temperature of between 30 and 60° C., or higher, prior to applying the ring opening polymerisable mixture to the surface to be bonded.

Depending on the target final properties of the field joint, the cyclic olefin monomers (or oligomers) may comprise mono or multiple reactive double bonds, thereby polymerising respectively into a thermoplastic or a thermoset polymer. Advantageously, the curable mixture is selected such as to provide a thermoset polyolefin having a glass transition temperature of more than 140° C. after curing, thus offering the same service temperature of the pipeline as the one offered by the parent coating.

Another preferred use comprises a protective article for connecting to a concrete element of a tunnel lining and having a protective portion which can be connected, on its inner side, to at least one surface of the concrete element, wherein the protective portion consists of a plastics material, and the protective portion is, on an outer side, provided with a seal of an elastic-plastic material. Such concrete elements are also referred to as "tubbing" and are used, for example, in mechanized shield tunneling.

It is important to provide a good adhesion between the protective portion of the protective article and the seal that is attached to the protective portion. A protective article, comprising a seal as first component and the protective portion as second component can be suitably made by the method of the invention. Such a method comprises pre-treating a surface of the seal, providing the seal in a mould comprising a cavity in the shape of the protective article, applying a ring-opening metathesis polymerisable mixture of cyclic olefin monomers and a catalyst to the mould and in contact with the surface, and curing the ring-opening metathesis polymerisable mixture in contact with the surface, wherein the ring-opening metathesis polymerisable mixture has a $\eta_{1000}$ at 30° C. of more than 9 sec.

A protective article thus produced is inserted into a forming mold, concrete is poured into the mold and the protective article is connected to the concrete and, once setting has taken place, is removed from the mold.

A protective article thus produced makes it possible to achieve a substantially water- and gastight joint sealing between concrete elements. It seals the protective lining of the tunnel appropriately in relation to liquids and gases.

Other useful uses of the ring-opening metathesis polymerisable mixture are in submersible or semi-submersible pontoons, such as employed in fish farms, harbors, off-shore wind mills and the like, and in ballasting bodies.

EXAMPLES AND COMPARATIVE EXAMPLES

The invention will now be illustrated further by referring to the Examples and Comparative Experiments below, without however being limited by these examples.

Methods

The parameter $\eta_{1000}$@30° C. is obtained by measuring the dynamic viscosity of an uncured ring-opening polymerisable mixture in accordance with well known principles.

A first method (Method 1) is used in the case of a single component mixture. In Method 1, 80 ml of a monomer mixture based on DCPD and TCPD monomers conditioned at 30° C. and having an initial viscosity of less than 600 mPa·s at 30° C. is introduced into a Brookfield viscosimeter cylindrical cell having a diameter of 55 mm and a height of 85 mm, made from polypropylene material. The Brookfield viscosimeter of type DVII+PRO is equipped with a mobile type S64 adapted to measure viscosity of a reactive mixture and the rotation speed is set at 50 rpm. Additionally a K-type thermocouple wire having a diameter of 0.5 mm and connected to an acquisition system having a sampling acquisition frequency of 2 Hz is fixed into the cell. Once the equipment is set up a ROMP catalyst is introduce into the mixture and mixed homogeneously. The viscosity and temperature measurements are immediately started and the time to reach a viscosity of 1000 mPa·s is recorded. This time is defined as $\eta_{1000}$@30° C. and represents the time needed to reach a dynamic viscosity of 1000 mPa·s at 30° C. The polymerization reaction is exothermic and the time to reach a temperature of 100° C. within the cell, as well as the maximum temperature peak values are also recorded. The time to reach 100° C. is defined as the smoke time—"SMT". The exothermic peak "ΔT" is defined as the maximum temperature peak minus 30° C.

A second method (Method 2) is used alternatively in the case of a 2 component mixture. In method 2, the 2 mixtures of ROMP-able monomers having on one side a ROMP catalyst precursor and on the other side an activator are introduced into a 2 compartment dispensing cartridge and conditioned at 30° C. Additionally a K-type thermocouple wire having a diameter of 0.5 mm and connected to an acquisition system having a sampling acquisition frequency of 2 Hz is fixed into the cell. After setting the viscosimeter in the same way as above, the mixture is poured into the viscosimeter cell using a 2 component pneumatic gun adapted to the cartridge via a static mixer. The viscosity measurement is immediately started and the time to reach a dynamic viscosity of 1000 mPa·s is recorded. This time is defined as $\eta_{1000}$@30° C. or the time to reach 1000 mPa·s at 30° C. The time to reach a temperature of 100° C. ("SMT"), and the maximum temperature peak values are also recorded. The exothermic peak "ΔT" is again defined as the maximum temperature peak minus 30° C.

Example 1: Preparation of Reactants to Make a PDCPD Based on a Tungsten Type Catalyst Reactant A:

A mixed solution of polymerization activator is prepared by mixing trioctylaluminum, dioctylaluminum iodide and diglyme at molar ratios of 85:15:100. The mixed solution is added to a mixture consisting of 95 parts by weight of purified dicyclopentadiene, 5 parts by weight of purified ethylidenenorbornene and 3.5 parts by weight of an ethylene-propylene-ethylidenenorbornene copolymer rubber having ethylene content of 70 mol % in an amount to give an aluminum content of 0.015 M to obtain an activator reactant solution A.

Reactant B:

Tungsten hexachloride (20 parts by weight) is added to 70 parts by volume of anhydrous toluene under nitrogen. The obtained mixture is mixed with a solution consisting of 21 parts by weight of nonylphenol and 16 parts by volume of toluene to obtain a catalyst solution containing 0.5 M of tungsten. The solution is purged with nitrogen over night to remove the hydrogen chloride gas formed by the reaction of tungsten hexachloride and nonylphenol. A catalyst solution for polymerization is prepared by adding 1 part by volume of acetylacetone to 10 parts by volume of the solution produced by the above procedure. To a monomer mixture consisting of 95 parts by weight of purified dicyclopentadiene and 5 parts by weight of purified ethylidenenorbornene is added 3.5 parts by weight of ethylene-propylene-ethylidenenorbornene copolymer rubber Nordel 4725 commercialise by the company Dow and with 2 parts by weight of Ethanox 702 as an oxidation stabiliser. The obtained solution is mixed with the above catalyst solution for polymerization in an amount to give a tungsten content of 0.005 M and obtain a catalyst reactant solution B.

The dynamic viscosity of the formulation according to example 1 is measured using Method 2 and gives an $\eta_{1000}$@30° C. value of 15 seconds. "SMT" and "ΔT" are found respectively at 55 s and 183° C.

Comparative Example 2: Preparation of Reactants to Make a PDCPD Based on Molybdenum Type Catalyst 5.5 parts of a styrene-butadiene-styrene block copolymer T411 commercialise by the company Asahi Kasei Chemicals is dissolved into a monomer mixture of 90 parts of dicyclopentadiene (DCPD) and 10 parts of tricyclopentadiene (TCPD). The solution is then poured into two containers. In one of them, diethyl aluminum chloride (DEAC), 1-propanol, and silicon tetrachloride are added to the mixture in such a way that their concentration is 33 millimols/kg, 40.7 millimols/kg, and 20 millimols/kg respectively to make reactant A. In the other container, tri(tridecyl) ammonium octamolybdate is added to the mixture in such a way that its concentration (atomic Mo) is 8 millimols/kg to make reactant B.

The dynamic viscosity of the formulation according to example 2 is measured using Method 2 and gives an $\eta_{1000}$@30° C. value of 7 seconds. "SMT" and "ΔT" are found respectively at 71 s and 181° C.

Comparative Example 3: Preparation of Reactants to Make a PDCPD Based on Molybdenum Type Catalyst Describes as "Telene 1650 Commercial System" in Patent Application Published Under EP2718347

5.5 parts of a styrene-butadiene-styrene block copolymer T411 commercialise by the company Asahi Kasei Chemicals is dissolved into a monomer mixture of 90 parts of dicyclopentadiene (DCPD) and 10 parts of tricyclopentadiene (TCPD). The solution is then poured into two containers. In one of them, diethyl aluminum chloride (DEAC), 1-propanol, and silicon tetrachloride are added to the mixture in such a way that their concentration is 33 millimols/kg, 42.9 millimols/kg, and 20 millimols/kg respectively to make reactant A. In the other container, tri(tridecyl) ammonium octamolybdate is added to the mixture in such a way that its concentration (atomic Mo) is 8 millimols/kg. 1.54% of 2,6-di-tertbutyl-p-crésol from Todini France SAS and 0.31% of Irganox 1010 from Adeka corporation are added to make reactant B.

The dynamic viscosity of the formulation according to example 3 is measured using Method 2 and gives an $\eta_{1000}$@30° C. value of 9 seconds. "SMT" and "ΔT" are found respectively at 82 s and 183° C.

Example 4: Preparation of Reactants to Make a PDCPD Based on Molybdenum Type Catalyst 5.5 parts of a styrene-butadiene-styrene block copolymer T411 commercialise by the company Asahi Kasei Chemicals is dissolved into a monomer mixture of 90 parts of dicyclopentadiene (DCPD) and 10 parts of tricyclopentadiene (TCPD). The solution is then poured into two containers. In one of them, diethyl aluminum chloride (DEAC), 1-propanol, and silicon tetrachloride are added to the mixture in such a way that their concentration is 33 millimols/kg, 42.9 millimols/kg, and 20 millimols/kg respectively to make reactant A.

In the other container, 0.2 phr of vinyl-norbornene (VNB) acting as a Chain Transfer Agent and tri(tridecyl) ammonium octamolybdate in such quantity that its concentration (atomic Mo) in the final mixture is 8 millimols/kg are added to the obtained mixture. 1.54% of 2,6-di-tert-butyl-p-crésol from Todini France SAS and 0.31% of Irganox 1010 from Adeka corporation are then added to make reactant B.

The dynamic viscosity of the formulation according to example 4 is measured using Method 2 and gives an $\eta_{1000}$@30° C. value of 12 seconds. "SMT" and "ΔT" are found respectively at 83 s and 181° C.

Example 5: Preparation of Reactants to Make a PDCPD Based on Molybdenum Type Catalyst Reactant A is the same as reactant A of example 4. 0.6 phr of vinylnorbornene (VNB) acting as a Chain Transfer Agent is added to reactant B of example 4 to make reactant B.

The dynamic viscosity of the formulation according to example 5 is measured using Method 2 and gives an $\eta_{1000}$@30° C. value of 18 seconds. "SMT" and "ΔT" are found respectively at 86 s and 180° C.

Example 6: Preparation of a PDCPD Based on Ruthenium Type Catalyst 10 parts of TCPD from Maruzen Corp. are added at 40° C. to 90 parts of commercial high purity DCPD "Ultrene" from Cymetech, llc, under nitrogen and then cooled down. 3.5 parts by weight of an ethylene-propylene-copolymer Versify 2300 commercialise by the company Dow is dissolved into the previous solution. Catalyst VC 843 commercialize by Umicore under the reference M42 is dissolved at a 30,000:1 monomer to catalyst molecular ratio in the monomer solution described above. 0.2% of antioxidant Isonox 132 is added to the above solution. Further addition of phenyltrichlorosilane activator to the solution, in a quantity giving a chloride to catalyst Ru metal mole ratio of 45 will trigger the reaction.

The dynamic viscosity of the formulation according to example 6 is measured using Method 1 and gives an $\eta_{1000}$@30° C. value of 22 seconds. "SMT" and "ΔT" are found respectively at 100 s and 185° C.

Comparative Example 7: Preparation of a PDCPD Based on Ruthenium Type Catalyst 10 parts of TCPD from Maruzen Corp. are added at 40° C. to 90 parts of commercial high purity DCPD "Ultrene" from Cymetech, llc, under nitrogen and then cooled down. 3.5 parts by weight of an ethylene-propylene copolymer Versify 2400 commercialise by the company Dow is dissolved into the previous solution. The solution is then poured into two containers. In one of them, catalyst VC 1161 also described as complex 4 in the international patent application published under publication number WO2011/009721 A1 is dissolved at a 30,000:1 monomer to catalyst molecular ratio. 0.2% of antioxidant Isonox 132 is then added to make reactant A. In the other container, 1.01 millimol/kg of phenyltrichlorosilane is added to the solution to obtain reactant B.

The dynamic viscosity of the formulation according to example 7 is measured using Method 2 and gives an $\eta_{1000}$@30° C. value of 5 seconds. "SMT" and "ΔT" are found respectively at 25 s and 182° C.

Example 8: Preparation of a PDCPD Based on Ruthenium Type Catalyst 10 parts of TCPD from Maruzen Corp. are added at 40° C. to 90 parts of commercial high purity DCPD "Ultrene" from Cymetech, llc, under nitrogen and then cooled down. 3.5 parts by weight of an ethylene-propylene copolymer Versify 2400 commercialise by the company Exon is dissolved into the previous solution. The solution is then poured into two containers. In one of them, catalyst VC 1161 also described as complex 4 in the international patent application published under publication number WO2011/009721 A1 is dissolved at a 30,000:1 monomer to catalyst molecular ratio. 100 ppm of Triethyl Phosphite acting as an inhibitor is added. Then 0.2% of antioxidant Isonox 132 is added to make reactant A. In the other container, 1.01 millimol/kg of phenyltrichlorosilane is added to the solution to obtain reactant B.

The dynamic viscosity of the formulation according to example 8 is measured using Method 2 and gives an $\eta_{1000}$@30° C. value of 10 seconds. "SMT" and "ΔT" are found respectively at 90 s and 184° C.

Example 9: Preparation of a PDCPD Based on Ruthenium Type Catalyst 10 parts of TCPD from Maruzen Corp. are added at 40° C. to 90 parts of commercial high purity DCPD "Ultrene" from Cymetech, llc, under nitrogen and then cooled down. 3.5 parts by weight of an ethylene-propylene copolymer Vistamax 3020 commercialise by the company Exon is dissolved into the previous solution. 60 ppm of Triethyl Phosphite acting as an inhibitor and 0.2% of antioxidant Isonox 132 are added. Catalyst C 848 having the empirical formula (Hill notation) $C_{46}H_{65}Cl_2N_2PRu$, also known as Grubbs Catalyst $2^{nd}$ generation and commercialized by Sigma Aldricht is dissolved at a 30,000:1 monomer to catalyst molecular ratio is added to trigger the reaction The dynamic viscosity of the formulation according to example 9 is measured using Method 1 and gives an $\eta_{1000}$@30° C. value of 45 seconds. "SMT" and "ΔT" are found respectively at 255 s and 178° C.

First Components

Component 1-1: PE-MD Sample

A medium density polyethylene compressed plate of thickness 15 mm supplied by the company Simona under the name of PE 1000 and designated as PE-MD,QN,33 G 000 according to ISO 17855-1, is machined down to thickness 5 mm and cut to format 100×108 mm.

Component 1-2: PE-HD Sample

A high density polyethylene extruded plate of thickness 5 mm supplied by the company Simona under the name of PE-HWU having a density of 0.955 is cut to format 100×108 mm. Faces are solvent wiped and sanded with sandpaper grain 60.

Component 1-3: PE-HD Sample

A high density polyethylene extruded plate of thickness 5 mm supplied by the company Simona under the name of PE 100 and designated as PE-HD,EACH,50 T 003 according to ISO 17855-1, is cut to format 100×108 mm. Faces are solvent wiped and sanded with sandpaper grain 60.

Component 1-4: PE-MD Sample

A medium density polyethylene compressed plate of thickness 15 mm supplied by the company Simona under the name of PE 500 and designated as PE-MD,QN,50 G 022 according to ISO 17855-1, is machined down to thickness 5 mm and cut to format 100×108 mm.

Component 1-5: PE-UHMW Sample

A ultra-high molecular weight polyethylene compressed plate of thickness 15 mm supplied by the company Simona under the name of PE 1000 Superlining having an average molecular weight superior to 9,000,000 g/mole and designated as PE-MD,QN,50 G 022 according to ISO 17855-1, is machined down to thickness 5 mm and cut to format 100×108 mm.

Component 1-6: PP Sample

A polypropylene compound extruded plate of thickness 5 mm supplied by the company *Borealis* under the name of Borcoat BB108E-119 is cut to format 100×108 mm. Faces are solvent wiped and sanded with sandpaper grain 60.

Component 1-7: PP Sample

An extruded plate of thickness 5 mm of polypropylene compound made of supplied by the company *Borealis* under the name of Borcoat BB108E-119 is cut to format 100×108 mm. Faces are solvent wiped and sanded with sandpaper grain 60.

Overmolding Process

A polymer sample according to any of components 1-1 to 1-7 is placed in a 10 mm thick closed mould suitable for reaction injection moulding that can be heated at various temperatures. On one side of the tool an injection gate has been created allowing injecting a reactive formulation. The 100×108×5 mm plate is fixed on one of the mould internal surfaces by the means of double sided adhesive tape, leaving a free space over the plate once the mould is closed of about 5 mm. A 108×20 mm self-adhesive silicone coated tape is applied on one surface along the longer edge of the polymer sample in order to create a failure initiation later on.

A single or bi-component formulation according to any of the (comparative) examples 1 to 9 is injected in the close mould between the external surface of the polymer sample and the opposite free surface of the mould using a single or 2 components cartridge equipped with a static mixer and powered by a pneumatic gun. All bi-component formulations are injected at the ratio 1:1 between reactant A and B.

The injection time is controlled by the pneumatic gun pressure and set up a 2 seconds for all the mould or formulation conditions. Conditions investigated are 20° C. and 30° C. for the temperature of the polymerisable mixture, 30° C. and 75° C. for the mold temperature. These conditions are covering typical molding conditions of industrial ROMP mixtures.

After injection, the reaction is allowed to take place and the mold opened after the completion of the reaction. The assembled part is taken out of the mold and allowed to cool down to ambient temperature in the open air. The obtained part having the dimensions of 100×108×10 mm is composed of 2 layers in contact with each other and presents a 20 mm failure initiation area along one of the edges and partly extending between the adhered surfaces.

Adhesion Tests

The assembled part is then saw cut in 20×100 mm strips having a 20×20 failure initiation area located at one end of the strip. The results of the adhesion tests are reported qualitatively as either adhesive—delamination happens between the metathesis polymer and the polyolefin layer usually with a significant standard deviation and is considered as not industrially usable—or the adhesion is reported as cohesive—the adhesion value is determined by the yield strength of the polyolefin. All the polyolefin samples have the same sample section but as the various polyolefines have different yield strength, comparison between the values is useless.

Results

The results obtained are summarized in the tables below. With ROMP mixtures according to the invention a consistently higher level of adhesion can be reached between the first polyolefin component and the second component made by ROMP of cyclic olefin monomers.

TABLE 1

Adhesion test results with mold temperature set up at 30° C. and mixture temperature set up at 20° C.

| Polyolefine reference/ROMP formulation reference | $\eta_{1000}$@30 C. (seconds) | Mould opening time | Component 1-1 | Component 1-2 | Component 1-3 | Component 1-4 | Component 1-5 | Component 1-6 |
|---|---|---|---|---|---|---|---|---|
| Example 1 | 15 | 120 | Cohesive | Cohesive | Cohesive | Cohesive | Cohesive | Cohesive |
| Comp. Ex. 2 | 7 | 120 | Adhesive | Adhesive | Adhesive | Adhesive | Adhesive | Adhesive |
| Comp. Ex. 3 | 9 | 120 | Adhesive | Adhesive | Adhesive | Adhesive | Adhesive | Adhesive |
| Example 4 | 12 | 120 | Cohesive | Cohesive | Cohesive | Cohesive | Cohesive | Cohesive |
| Example 5 | 18 | 120 | Cohesive | Cohesive | Cohesive | Cohesive | Cohesive | Cohesive |
| Example 6 | 22 | 360 | Cohesive | Cohesive | Cohesive | Cohesive | Cohesive | Cohesive |
| Comp. Ex. 7 | 5 | 120 | Adhesive | Adhesive | Adhesive | Adhesive | Adhesive | Adhesive |
| Example 8 | 10 | 120 | Cohesive | Cohesive | Cohesive | Cohesive | Cohesive | Cohesive |
| Example 9 | 45 | 360 | Cohesive | Cohesive | Cohesive | Cohesive | Cohesive | Cohesive |

TABLE 2

Adhesion test results with mold temperature set up at 75° C. and mixture temperature set up at 20° C.

| Polyolefine reference/ROMP formulation reference | $\eta_{1000}$@30 C. (seconds) | Mould opening time | Component 1-1 | Component 1-2 | Component 1-3 | Component 1-4 | Component 1-5 | Component 1-6 |
|---|---|---|---|---|---|---|---|---|
| Example 1 | 15 | 90 | Cohesive | Cohesive | Cohesive | Cohesive | Cohesive | Cohesive |
| Comp. Ex. 2 | 7 | 90 | Adhesive | Adhesive | Adhesive | Adhesive | Adhesive | Adhesive |
| Comp. Ex. 3 | 9 | 90 | Adhesive | Adhesive | Adhesive | Adhesive | Adhesive | Adhesive |
| Example 4 | 12 | 90 | Cohesive | Cohesive | Cohesive | Cohesive | Cohesive | Cohesive |
| Example 5 | 18 | 90 | Cohesive | Cohesive | Cohesive | Cohesive | Cohesive | Cohesive |
| Example 6 | 22 | 240 | Cohesive | Cohesive | Cohesive | Cohesive | Cohesive | Cohesive |
| Comp. Ex. 7 | 5 | 90 | Adhesive | Adhesive | Adhesive | Adhesive | Adhesive | Adhesive |
| Example 8 | 10 | 90 | Cohesive | Cohesive | Cohesive | Cohesive | Cohesive | Cohesive |
| Example 9 | 45 | 240 | Cohesive | Cohesive | Cohesive | Cohesive | Cohesive | Cohesive |

TABLE 3

Adhesion test results with mold temperature set up at 75° C. and mixture temperature set up at 30° C.

| Polyolefine reference/ ROMP formulation reference | η1000@30 C. (seconds) | Mould opening time | Component 1-1 | Component 1-2 | Component 1-3 | Component 1-4 | Component 1-5 | Component 1-6 |
|---|---|---|---|---|---|---|---|---|
| Example 1 | 15 | 70 | Cohesive | Cohesive | Cohesive | Cohesive | Cohesive | Cohesive |
| Comp. Ex. 2 | 7 | 70 | Adhesive | Adhesive | Adhesive | Adhesive | Adhesive | Adhesive |
| Comp. Ex. 3 | 9 | 70 | Adhesive | Adhesive | Adhesive | Adhesive | Adhesive | Adhesive |
| Example 4 | 12 | 70 | Cohesive | Cohesive | Cohesive | Cohesive | Cohesive | Cohesive |
| Example 5 | 18 | 70 | Cohesive | Cohesive | Cohesive | Cohesive | Cohesive | Cohesive |
| Example 6 | 22 | 210 | Cohesive | Cohesive | Cohesive | Cohesive | Cohesive | Cohesive |
| Comp. Ex. 7 | 5 | 70 | Adhesive | Adhesive | Adhesive | Adhesive | Adhesive | Adhesive |
| Example 8 | 10 | 70 | Cohesive | Cohesive | Cohesive | Cohesive | Cohesive | Cohesive |
| Example 9 | 45 | 210 | Cohesive | Cohesive | Cohesive | Cohesive | Cohesive | Cohesive |

The invention claimed is:

1. A method for preparing an article, comprising a pipe line field joint or a concrete tunnel protective lining element, said article comprising at least a first component of a polyolefin, selected from a polyethylene and/or a polypropylene, in conjunction with a second component of a polymer made by ring-opening metathesis polymerisation of cyclic olefin monomers, the method comprising:
pre-treating a surface of the first component,
applying a ring-opening metathesis polymerisable mixture of cyclic olefin monomers and a catalyst to the surface, and
curing the ring-opening metathesis polymerisable mixture in contact with the surface,
wherein the ring-opening metathesis polymerisable mixture has a mow at 30° C. of more than 9 sec,
wherein the level of adhesion between the first and the second component is such that a cohesive failure of the first component occurs when loaded;
wherein the ring-opening metathesis polymerisable mixture comprises a chain transfer agent; and
wherein the ring-opening metathesis polymerisable mixture comprises from 0.01-10 PHR of the chain transfer agent.

2. The method of claim 1, wherein the ring-opening metathesis polymerisable mixture has a mow at 30° C. of more than 10 sec.

3. The method of according to claim 1, wherein applying the ring-opening metathesis polymerisable mixture to the surface comprises injecting the mixture against the surface.

4. The method of claim 1, wherein the pre-treatment comprises cleaning, abrading, sanding or machining the surface, or combinations thereof.

5. The method of claim 1, wherein the ring-opening metathesis polymerisable mixture comprises an inhibitor.

6. The method of claim 5, wherein the ring-opening metathesis polymerisable mixture comprises from 0.01-2 PHR of the inhibitor.

7. The method of claim 1, wherein the ring-opening metathesis polymerisable mixture comprises a chain transfer agent and an inhibitor, wherein the ratio of inhibitor to chain transfer agent is from 0.001 to 200.

8. The method of claim 1, wherein the cyclic olefin comprises norbornene.

9. The method of claim 1, wherein the article comprises a protective element for a concrete tunnel lining element.

10. The use of a ring-opening metathesis polymerisable mixture in accordance with claim 1 as a field joint coating material or as a protective article for a concrete tunnel lining element.

11. The use of a ring-opening metathesis polymerisable mixture in accordance with claim 1 in a submersible or semi-submersible pontoon or in a ballasting body.

12. The method of claim 1, wherein the ring-opening metathesis polymerisable mixture has a $\eta_{1000}$ at 30° C. of more than 12 sec.

13. The method of claim 1, wherein the ring-opening metathesis polymerisable mixture has a $\eta_{1000}$ at 30° C. of more than 14 sec.

14. The method of claim 1, wherein the ring-opening metathesis polymerisable mixture has a $\eta_{1000}$ at 30° C. of more than 16 sec.

15. The method of claim 1, wherein the ring-opening metathesis polymerisable mixture has a $\eta_{1000}$ at 30° C. of more than 20 sec.

* * * * *